United States Patent

[11] 3,618,648

| [72] | Inventor | Jean-Paul Becq<br>Pau, France |
|---|---|---|
| [21] | Appl. No. | 824,579 |
| [22] | Filed | May 14, 1969 |
| [45] | Patented | Nov. 9, 1971 |
| [73] | Assignee | Societe anonyme dite, Societe des Establissements Fordimit<br>Basses-Pyrenees, France |
| [32] | Priorities | May 17, 1968 |
| [33] | | France |
| [31] | | 152,238;<br>Mar. 19, 1969, France, No. 6907847 |

[54] APPARATUS FOR PITTING PULPY FRUITS AND, MORE PARTICULARLY, PRUNES
17 Claims, 17 Drawing Figs.

| [52] | U.S. Cl. | 146/17 A, 146/19 |
|---|---|---|
| [51] | Int. Cl. | A23n 3/04 |
| [50] | Field of Search | 146/17, 17.1, 24, 27, 19 |

[56] References Cited
UNITED STATES PATENTS

| 1,244,757 | 10/1917 | Morse | 146/19 |
|---|---|---|---|
| 2,360,103 | 10/1944 | Britten | 146/27 |
| 2,558,205 | 6/1951 | Ashlock, Jr. | 146/19 |
| 2,567,591 | 9/1951 | Ashlock, Jr. | 146/27 |
| 2,740,440 | 4/1956 | Wright | 146/17 |
| 3,291,172 | 12/1966 | Tomelleri | 146/19 |
| 3,561,583 | 2/1971 | Tomelleri | 146/17 A |

Primary Examiner—William S. Lawson
Assistant Examiner—F. R. Bilinsky
Attorney—Karl Ross ABSTRACT: An apparatus for the depitting of pulpy fruit especially prunes wherein a multiplicity of cup-shaped dies each having a relatively wide mouth and a narrow aperture opposite the mouth and defined by a resilient membrane to pass the pit or stone. The cups, which have interior cavities conforming to surfaces of revolution, receive an axially displaceable plunger which pierces the fruit in the cup and drive the pit or stone out through the narrow opening. A membrane below the opening has resilient walls which permit the pit to be forced therethrough by the plunger but retain the meat of the fruit in the cup. Means is provided to reshape the depitted fruit.

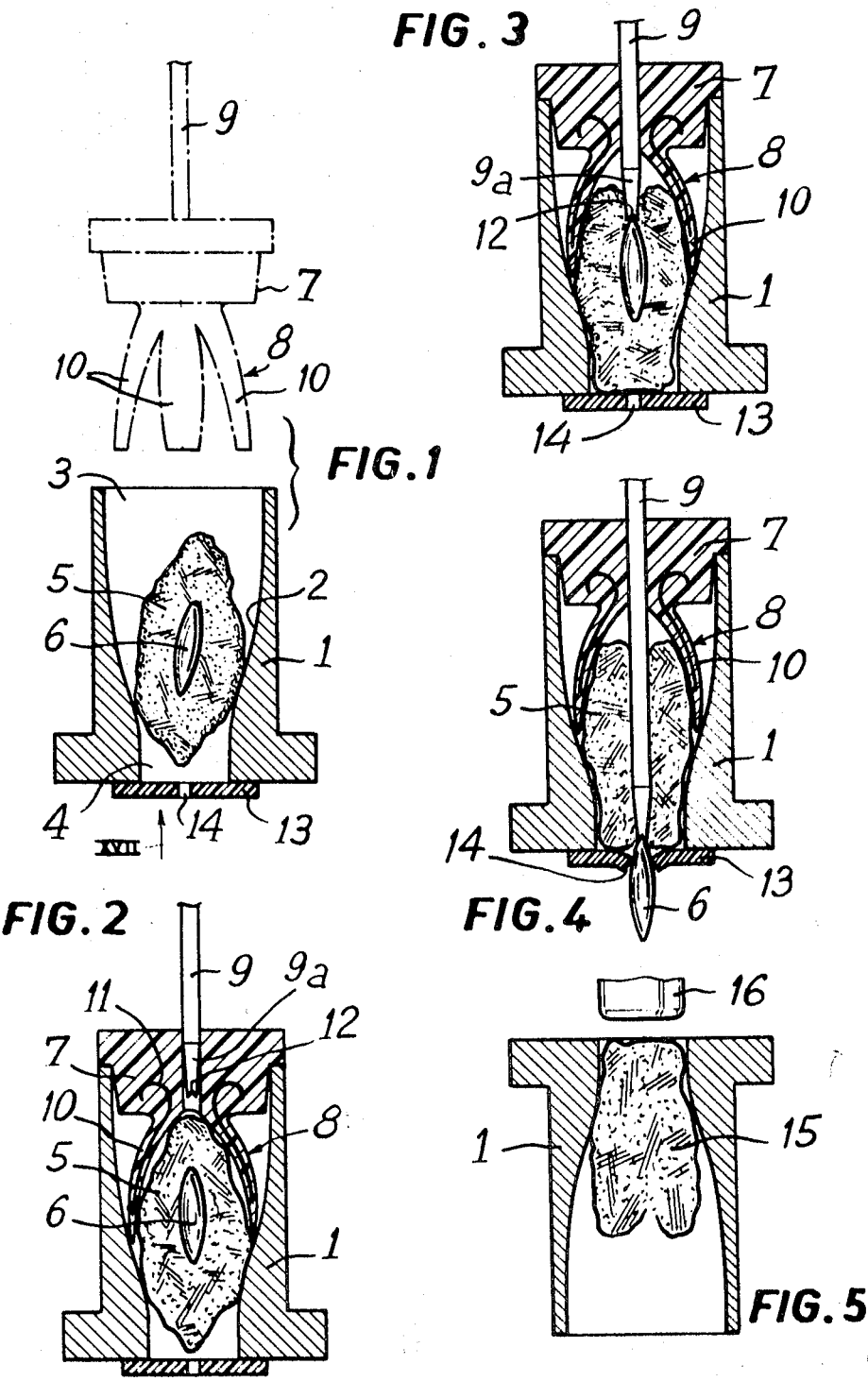

Jean-Paul Becq
Inventor.

By Karl G. Ross
Attorney

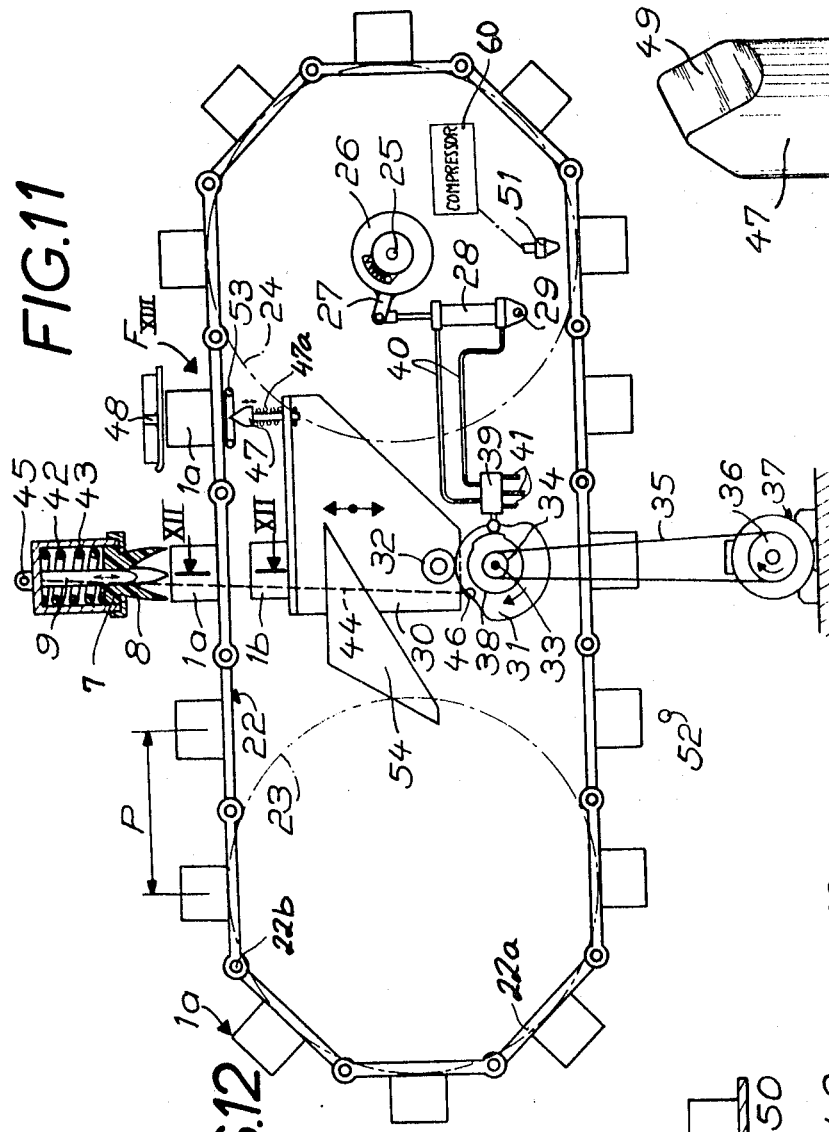
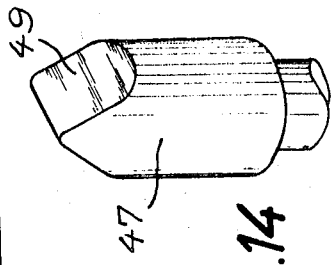
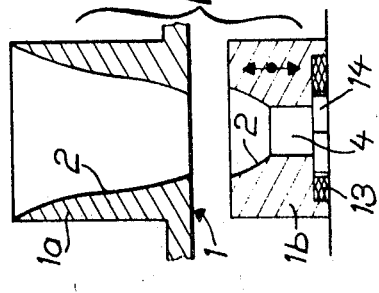
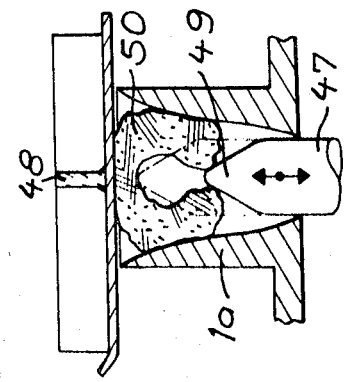

Jean-Paul Becq
INVENTOR.

BY

Karl F. Ross
Attorney

APPARATUS FOR PITTING PULPY FRUITS AND, MORE PARTICULARLY, PRUNES

FIELD OF THE INVENTION

The present invention relates to apparatus for the depitting of pulpy drupaceous fruit, especially prunes and, more particularly, to an automatic device for the removal of pits or stones from such fruit and the reshaping of the depitted fruit.

BACKGROUND OF THE INVENTION

Pulpy fruit, especially prunes after drying, contain within a relatively dry skin, a moist and plastic pulp or meat which surrounds the pit or stone. It has been proposed heretofore to depit such fruit by driving a depitting plunger through the fruit while the latter is retained against movement. Several problems have been encountered in such systems and, as practical matter, it has not been possible heretofore to make depitting apparatus of this character automatic and yet obtain therefrom depitted fruit of a satisfactory shape or condition.

One of the difficulties in the depitting of pulpy fruit is the entrainment of a portion of the pulpy matter from the interior of the fruit with the pit through the opening formed in the fruit as the pit is driven therefrom. The trail of pulp or the meat educed therefrom externally of the skin renders the fruit unsatisfactory for many comestible uses and especially for direct distribution, i.e., packaging and sale of the fruit as such and without the incorporation of the fruit in other food products. A second difficulty arising from earlier systems for depitting of prunes and like pulpy fruit containing relatively large stones or kernels is the relatively large opening formed therein as the pit is ejected. Here again, the appearance of the fruit is detrimentally affected and widespread use of the prior art method is limited.

Thirdly, in systems in which it is desirable to fill the interior of the prune with a comestible stuffing, prior art depitting systems have failed to provide a satisfactory configuration of the opening and have permitted trailing meat expelled from the interior to create problems in such filling.

Finally, most prior art systems for the depitting of prunes, not only detrimentally affect the appearance, configuration and edible qualities of the fruit, but also are extremely complex, unreliable and incapable of operating at the high speeds necessary to render the systems satisfactory for large scale use.

OBJECTS OF THE INVENTION

It is, therefore, the principal object of the present invention to provide an automatic machine or apparatus for the depitting of pulpy fruit, especially prunes following their drying, wherein the aforementioned disadvantages are obviated and depitting can be carried out at a relatively high rate and with a minimum of difficulty to yield well shaped pleasantly appearing depitted fruit which may be marketed without further treatment and which may be filled or otherwise treated as desired.

Another object of this invention is to provide an improved apparatus for the depitting of prunes which yields depitted fruit having the configuration of "cocktail prunes" with a minimum of difficulty.

SUMMARY OF THE INVENTION

An apparatus for depitting a drupaceous pulpy fruit, according to the invention which is able to overcome these disadvantages, includes a fruit-receiving cup having a relatively wide mouth adapted to receive a fruit to be depitted and a relatively narrow discharge opening opposite this mouth; orienting means receivable in the cup for arranging the fruit therein with the pit of the fruit extending substantially axially; a plunger adapted to enter the mount and shiftable axially through the cup to drive the pit from the fruit through said opening; and stripping means adjacent the opening for retaining the fruit in the cup while permitting passage of the pit therepast.

According to an important feature of the invention, the fruit-receiving cup is a tubular die formed with an axial throughgoing passage having the wide mouth at one end and the narrow opening at the other end. An axially displaceable plug is receivable in the mouth of the die and is formed with an axial bore, the plunger being formed as a slender punch slidable in the bore and of lesser diameter than the pit-ejecting opening; the stripper means includes a resilient membrane removably overlying the opening in the die and formed with a deformable aperture or orifice in line with this passage and normally of smaller cross-sectional area than same.

The orienting means includes a plurality of resilient fingers formed unitarily on the plug with free ends engageable with the interior of said passage and diverging away from the plug, the passage having the shape of a surface of revolution with a generatrix approaching the axis at the reduced cross section portion of the passage near the pit-ejecting opening. The orienting means can be formed by resilient metal bands embedded in the fingers and a layer of synthetic resin material covering the fingers. The punch has a diameter between 1 and 3 mm. and is formed with a concavity at its pit-engaging end.

When the passage is formed with a coaxial annular recess, or widening at the junction with the reduced cross section portion, the orienting means having a pit-engaging end formed with a rim in line with the shoulder at this junction. In this latter embodiment, the punch has a diameter between 3 and 12 mm. and a substantially conical rounded pit-engaging end.

The apparatus described in general terms above, thus makes use of a vertically shiftable and axially symmetrical plug having a frustoconical portion which fits in the mouth of the fruit-receiving cut and thus constitutes a centering membrane for both the plunger and the fruit-orienting means formed on the lower end or underside of this plug. As previously noted, the plug may be resiliently mounted in the actuating means for the plunger so as to retain the fruit within the cup while the plug itself is held against axial movement by an outwardly extending flank resting upon the lip of the cup surrounding the cup thereof. An axially extending bore within this cup is axially aligned within the membrane opening and acts as a guide for the plunger, thereby ensuring appropriate alignment of the plunger and the membrane opening at all times. As noted, the lower end of the plug serves as fruit-orienting means in combination with an inwardly bulging wall portion of the cup at the junction between the large cross section and small cross section portions thereof. The resilient membrane may also be formed with an opening which is, of course, of smaller cross section than the opening of the cup so that it partly obstructs the latter and prevents the eduction of pulp or meat with the pit around the plunger. In addition, any meat or pulp tending to adhere to the pit is stripped by the membrane which tightly hugs the pit as it is thrust through the orifice in the membrane and prevents entrainment of the pulp or meat with the pit.

The present invention also includes an embodiment wherein the fruit is not pierced by the plunger or punch which, to this end, is a relatively wide member and cooperates with a shoulder formed in the die or cup at the junction between the reduced-diameter portion of the passage and an outward enlargement of the cup interior. In this system, the prune is flattened by the pressure of the plunger without piercing the skin and the pit is forced through the bottom of the fruit and the orifice in the resilient membrane. To dislodge the pit from the membrane, I provide a blade adjacent the orifice and adapted to sweep thereagainst for engagement with the pit.

According to still another feature of this invention, a row of fruit-receiving cups or dies is provided across an endless conveyor means and a number of such rows is provided in equispaced relationship therealong. The conveyor drive is stepped by an integral number of interrow spacings, preferably a single increment, and is synchronized with means for displacing a number of centering plugs, orienting members and plungers as described above. The membrane may be mounted beneath the pit-ejection station and can be brought upwardly into position against the bottom of the cup by the drive means as the plungers are forced through the cup to dislodge the pit. Alternatively, the membrane may be provided by a lower cup section which registers with the successive upper cup sections in the pit-ejection station, the lower section being thereafter withdrawn to permit advance of the conveyor means. Downstream of the pit-ejection station, I may provide a reshaping station in which the depitted fruit, while retained in the die, are thrust against a reshaping plate by a rod or the like inserted through the narrow opening of the cup. Further downstream, there is provided an ejection station at which a plunger thrusts the depitted fruit from its cup or a compressed air jet ejects the fruit through the open mouth of the cup.

DESCRIPTION OF THE DRAWINGS

The above and other objects, features, and advantages will become more fully apparent from the following description, reference being made to the accompanying drawings, in which:

FIGS. 1 through 5 show, in vertical section, successive operations carried out by a first embodiment of the apparatus according to the present invention;

FIG. 11 is a largely schematic side view of a third embodiment of the apparatus according to the present invention;

FIG. 12 is a section taken along line XII—XII of FIG. 11;

FIG. 13 is a sectional detail of the structure indicated by arrow XIII of FIG. 11;

FIG. 14 is a perspective view of a detail of FIG. 11;

SPECIFIC DESCRIPTION

Figure 6:
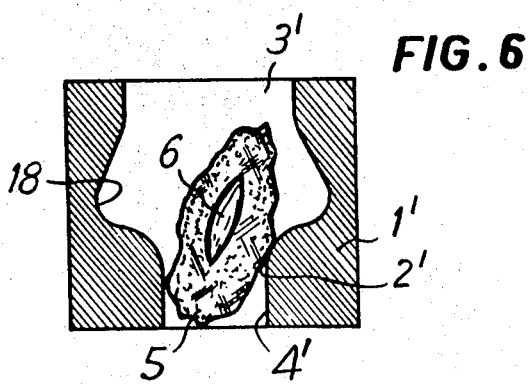
FIGS. 6 through 10 show, in vertical section, successive operations carried out by a second embodiment of the apparatus according to the present invention.

As shown in FIGS. 1 through 5, the pitting device comprises a tubular die or matrix 1 in the form of a cap advantageously made of stainless steel. This die 1 has an internal wall 2 formed as a surface of revolution whose surface lines (generatrices) are curved and converge downwardly toward the axis to define a region of reduced cross section adjacent the bottom opening of the cup.

The die 1 has a large upper opening or mouth 3 (to receive the fruit 5) and a smaller base opening 4 (for ejection of the pit), the prune 5 to be pitted being receivable between them. Each prune 5 is simply dropped into the die 1 and naturally assumes a somewhat upright position due to the convergence of the interior walls 2 of the die 1, as shown in FIG. 1. In this position, the stone or pit 6 of the prune which is naturally elongated and avoid (i.e., generally lenticular), is also arranged essentially vertical by, i.e., generally along the axis of the cup.

Above the die 1 in FIG. 1, shown in dot-dash lines, is a plug 7 provided with an orienting member 8 and a punch or plunger 9 all of which are coaxial with the die 1. The plug 7 is adapted to fit tightly within the mouth 3 of the die 1 and is preferably made of nonreactant plastic, e.g., Teflon. This plug 7 is vertically displaceable by means which will be described below, as is the punch 9.

The cup is formed by a plurality of independently yieldable and deflectable fingers 10 (four in the embodiment shown) unitarily formed with the plug 7. The fingers define a downwardly open paraboloidal cup and are composed of synthetic resin and extend downwardly and slightly outwardly as shown in FIG. 11. The extreme lower ends of these fingers 10 in tulip array are intended to be cammingly engaged by the downwardly converging interior wall 2 of the die 1 and forced inwardly, toward one another. This camming action causes them to clutch the prune 5, forcing it slightly downward while at the same time aligning the pit 6 coaxially with the die 1.

As best shown in FIGS. 2–4, the fingers 10 are reinforced by small resilient bands 11 around which they are formed. These bands 11 may be made of spring steel or an alloy to give the fingers 10 excellent, long-lasting resilience. The thickness or width of these fingers 10 may decrease toward their free ends and their number can be any greater than two, although it has been found to be advantageous to use a relatively large number, i.e., four, six, or eight.

The plunger or punch 9 is a simple shaft which can slide in the plug 7. Its diameter in this embodiment is preferably between 1 and 3 mm. since the hole which it will make in the prune 5 should be as small as possible. To minimize the size of this hole the punch 9 has a lower end portion 9a which is generally conical and cleft at 12. In this manner, if the shaft is 3 mm. in diameter, the point only pierces a hole around 2 mm. in diameter which will suffice to pass the 3 mm. shaft because of elasticity of the skin of the prune. The punch 9 here is advantageously of stainless steel and its tip 9a is case hardened at 12 for greatest service life. The cleft 12 at the tip of the punch 9 forms a small concavity that facilitates engaging the pit 6.

Figure 17:
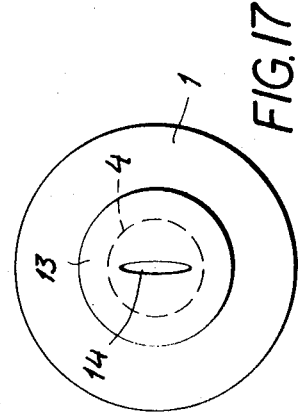
FIG. 17 is a bottom plan view taken in the direction of arrow XVII of FIG. 1.

Finally, the opening 4 in the bottom of the die 1 is covered by a membrane 13 formed with a small aperture 14 during the actual pitting operation. This membrane 13 is removable, normally lying over the opening 4, and is composed of some resilient elastomeric material such as rubber or plastic, or even can be made of spring steel (or a resilient alloy). Its hardness depends on the fruit to be pitted, although a Shore hardness of between 40 and 80 has been found advantageous. The aperture 14 thus forms a pair of lips through which the pit 6 may be forced, and is to this purpose preferably made oval, as shown in FIG. 17. These lips, as will be shown below, scrape the pit 6 to prevent loss of the meat or pulp of the prune 5.

Figure 15:
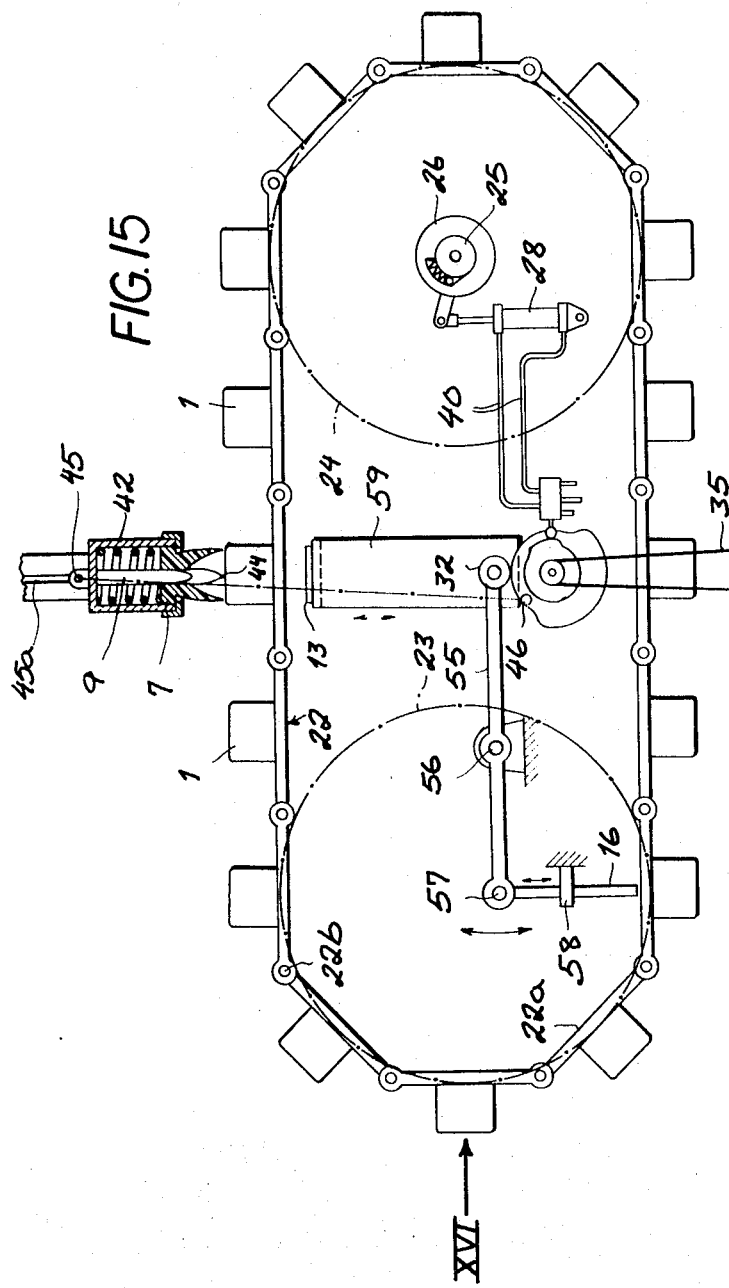
FIG. 15 is a largely schematic side view of the first embodiment of the present invention.
Figure 16:
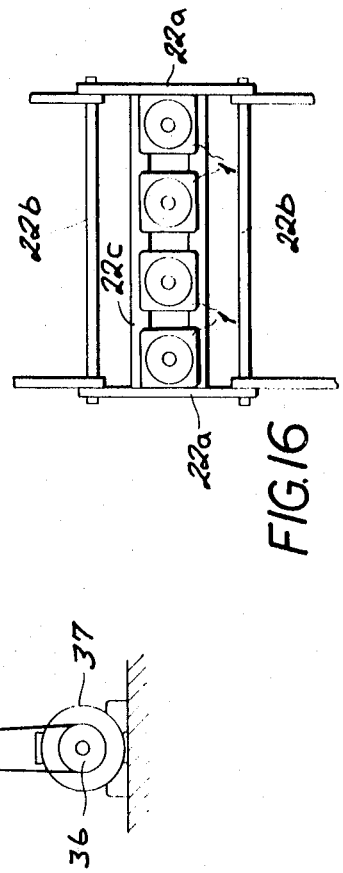
FIG. 16 is an end view taken in the direction of arrow XVI of FIG. 15.

FIGS. 15 and 16 illustrate an apparatus which is usable with the pitting device shown in FIGS. 1–5.

An endless transport band 22 has a plurality of links 22a each mounting four dies 1 via two transverse beams 22c. Rods 22b define the pivot points of the links 22a. Neighboring ranks of dies 1 are spaced apart at a distance P. The band 22 extends around an idler wheel 23 and a driven wheel 24, both shown in dot-dash lines.

The drive wheel 24 is fixedly mounted on a shaft 25 on which a one-way or freerunning clutch 26 sits. A crank arm 27 on this clutch 26 is pivotally coupled to the piston rod of a cylinder 28 pivotally mounted to a fixed point 29. Feed lines 40 for the double-acting cylinder 28 are connected to a valve 39 from which lines 41 extend to a source (not shown) of fluid pressure such as a compressor.

An electric motor 37 (drive means) is connected through a speed-reducing transmission to a pulley 36 which is connected to a second pulley 34 via a V-belt 35. This pulley 34 is fixedly mounted on an arbor 33 also carrying a cam 31 and a cam 38. The latter cam 38 serves to actuate the valve 39 periodically, thereby stepping the conveyor band 22 by the distance P. The cam 31 contacts a roller sleeve 32 on one arm of a double-arm lever 55 pivoted at a fixed point 56. In addition it mounts at an eccentric 46 a connecting rod 44 whose other end is connected to a rod 45 mounting four punches 9 and 7. Only one plug 7, die 9, etc. can be seen in FIG. 15, the other three are directly in line behind it and, therefore, not visible. A vertical guide 45a slidably mounts an end of the rod 45. A table 59 is also connected to the roller 32 such that it moves up and down as the cam 31 rotates. Four membranes 13 are mounted on the top of this table 59. The left-hand end of the lever 55 pivots four knockout or ejector rods 16 which are guided in lugs 60 fixed to the machine housing.

Each of the four plugs 7 is slidable within a cup 42 fixed to the connecting rod at 45 and arranged to ride up and down relative to the band 22 and is biased downwardly by a spring 43. Each of the four punches 9 is simply attached to the cup 42. Thus, relative to the direction of travel of the dies 1, which direction is itself transverse to the axes of these dies, the plug 7, punch 9, membrane 13, and knockout rods 16 all move transversely and, therefore, axially relative to the dies 1.

The apparatus functions as as follows:

As the dies 1 are stepped toward the plugs 7 and their mouths 3 open upwardly, a prune 5 is loaded automatically or by hand into each one. When the row of dies 1 comes below the row of plugs 7 and is stopped there, the cam 31 turns first bringing the membranes 13 up tightly against the bottoms of the dies 1, and then bringing the plug 7 down onto the dies 1. As shown in FIG. 2, as the plug 7 fully seats on the die 1, it aligns each pit 6 coaxial to the die 1 and compresses it downwardly. Then the plugs 7 move up against the force of the springs 43 and the punches 9 pierce the prunes 5 (FIG. 3) and contact the pits 6. Continued descent of the punches 9 (FIG. 4) forces the pits 6 out through the apertures 14.

As the cam 31 continues to turn the punches 9 are first withdrawn from the prunes 5, the plugs 7 are pulled up, and the membranes 13 pulled down. The cam 38 then actuates the valve 39 to step the drive 24-29 once thereby advancing the pitted row of prunes and commencing another pitting cycle.

At the same time as one row of prunes is being pitted, the lever 55 is being rotated to force the knockout rods 16 through the upside-down dies 1 thereby knocking out the prunes lodged therein, as shown in FIG. 5. Each rod 16 is advantageously of a diameter that is slightly less than that of the opening 4 and is also made of stainless steel.

FIGS. 6-10 illustrate an alternative embodiment of the present invention having a die 1' with an internal wall 12', a mouth 3', an outlet opening 4', equipped with a membrane 13' with an aperture 14', and a punch 9' movable through a plug 7'. In most details, this embodiment is similar to that of FIGS. 1-5.

The plug 7', however, is provided at its lower end with a cup-shaped depression 17 and the die 1' is formed with an internal annular recess 18 formed by a shoulder. In addition, the punch 9' has a blunt, slightly conical end 19 and is between 3 and 12 mm. in diameter. The annular rounded lower edge of the punch 9' is in line with the shoulder of the recess 18.

Figure 7:
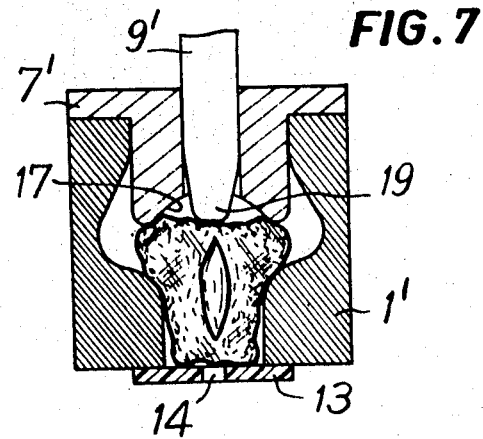

This embodiment functions as follows:

The prune 5 is dropped in the die 1' as in the previous embodiment and, again, naturally assumes a somewhat vertical position. The base of the die 1' is covered by the membrane 13' and the plug 7' is fully introduced into the mouth 3'. This compresses the meat of the prune 5, forcing it outwardly into the recess 18 without rupturing the skin by means of the rounded rim on the punch 9', as shown in FIG. 7.

Figure 8:
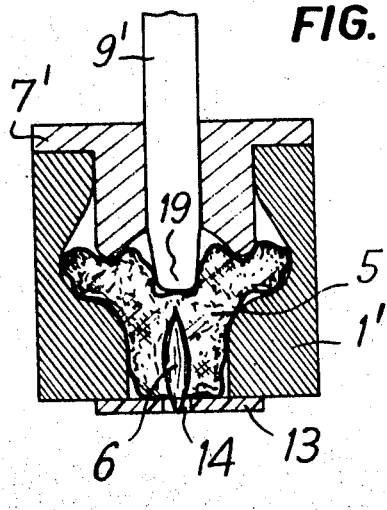

The blunt, slightly rounded end 19 is then pushed through the plug 7' and against the prune 5, forcing the pit 6 downwardly. FIG. 8 shows that a certain amount of meat still remains between the pit 6 and the end 19 of the punch 9', so that the skin of the prune 5 is still unbroken. Fully advancing the punch 9' forces the pit 6' out through the opposite side of the prune 5 and causes it to lodge in the aperture 14. The punch 9' stops in this position, short of the membrane 13', to avoid puncturing the prune's skin itself.

Figure 9:
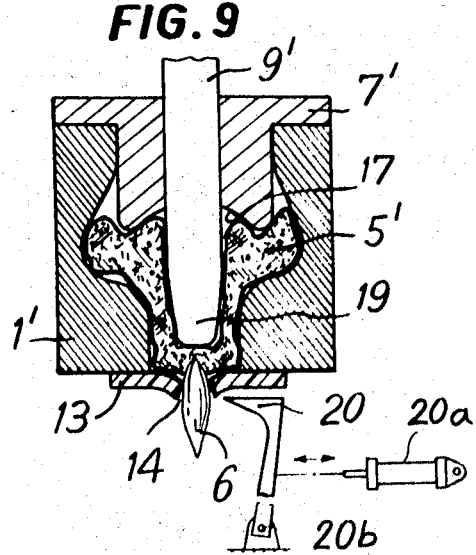
Figure 10:
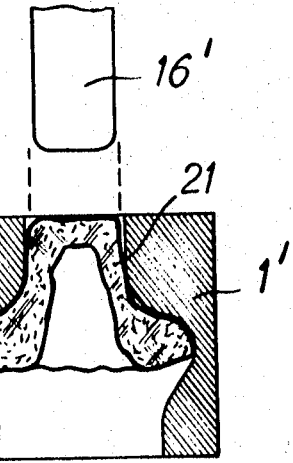

A blade 20 pivoted at 20b and operated by a cylinder 20a can then strike the pit 6 transverse to the axis of the die 1' and dislodge it from the membrane 13, as shown in FIG. 9.

A pitted prune 21 is then left in the die 1' (FIG. 10) and can be knocked out by a rod 16' similar to the rod 16. Although the pitted prune 21 is here greatly deformed, it has only one perforation and can easily be rolled or reformed back into shape. This pitting device can easily be mounted on the apparatus illustrated in FIGS. 15 and 16.

FIGS. 11-14 illustrate a third prune pitting apparatus which is entirely automatic and produces a so-called "cocktail" shape, with none of the sticky meat of the prune on the outside where it can get on the fingers.

Reference numerals in FIG. 11 common to FIG. 15 apply to identical structure which will not be described again here.

Die bodies 1a (see FIG. 12) are carried on the conveyor chain 22 and die bases 1b are mounted on a table 30 which is coupled to the follower 32 ro ride up and down on the cam 31. The bodies 1a are the greater part of the die 1 whereas the bases 1b, which fit the bodies 1a perfectly, are only the extreme lower portions and mount the membrane 13. A great many such bodies 1a are mounted on the conveyor 22 whereas only a quantity of bases 1b equal to the amount of bodies 1a in a single row, here four, are provided. The bodies 1a and bases 1b are arranged in rows as in FIGS. 15 and 16, and together each base 1b and body 1a forms a die 1" of the same configuration as the dies 1 of FIGS. 1-5.

Thus, as in the embodiment of FIG. 15, as the motor 37 turns, the conveyor 22 is automatically advanced in steps equal to the distance P, the bases 1b are applied to one row of bodies 1a, the prunes pitted by the punch 9, and the bases 1b and plug 7 withdrawn.

In this embodiment, however, one step downstream, or distance P downstream, is a group of forming rods 47 mounted on the table 30 and plate 48 just above this location to the other side of the conveyor 22. Each rod 47 can be pressed down through the table 30 against the force of a spring 47a to prevent crushing of very large prunes. In this manner, as one row of prunes is being pitted, the rods 47 rise up through the openings 4 (which they fit closely) in the bodies 1a which are one step downstream and force the prunes against the cover 48 and up into a shape 50 with their chisel points 49 which have the shape of a rounded dihedral. This action folds the prunes back into themselves thereby making for a much neater pitted fruit having all its meat covered by a relatively dry skin. On withdrawal of the rods 47, the prunes drop back into the die bodies 1a.

As the rows of prunes 50 thru shaped continue to advance along the conveyor path, they pass under nozzles 51 which are connected to a compressor 60 and blast a jet of air down through the bodies 1a. This jet can blow continuously, or only once per work cycle of the apparatus. Such a blast dislodges the pitted and shaped prunes from the bodies 1a and allows them to be collected below.

Downstream of these nozzles 51 is a row of further nozzles 52 which direct a spray of high-pressure water up into the empty bodies 1a to clean them. The forming rods 47 are similarly washed by annular, inwardly directed nozzles 53 directing water against them. These nozzles 53 are mounted just below the conveyor 22 and above the rods 47.

In order to catch the pits which are removed from the prunes, a funnel 54 is located adjacent the table 30 and is arranged to catch them. Its open end is positioned below the bases 1b.

All of the different steps carried out by this apparatus take place at locations along the path of the conveyor 22 which are separated by multiples of the distance P. Thus, at each stop of the conveyor 22 prunes can be loaded in, pitted, reformed, blown out, and die bodies can be washed. Furthermore, the spacing of the membranes 13, plugs 7, rods 47, nozzles 53, 51 and 52 is always equal to the spacing transverse to the transport direction between the dies 1 in the same row.

What is claimed is:

1. An apparatus for depitting a drupaceous pulpy fruit, said apparatus comprising:

a fruit-receiving cup having a relatively wide mouth adapted to receive a fruit to be depitted and a relatively narrow discharge opening opposite said mouth, said cup being a tubular die formed with an axial throughgoing passage having said wide mouth at one end and said narrow opening at the other end;

orienting means receivable in said cup for arranging said fruit therein with the pit of said fruit extending substantially axially, a plunger adapted to enter said mouth and shiftable axially through said cup to drive said pit from said fruit through said opening;

stripping means adjacent said opening for retaining the fruit in said cup while permitting passage of said pit therepast and an axially displaceable plug receivable in said mouth and formed with an axial bore, said plunger being a punch slidable in said bore and of lesser diameter than said opening, said stripper means including a removable resilient membrane engageable over said opening and formed with a deformable aperture in line with said passage and normally of smaller cross-sectional area than said opening, said orienting means including a plurality of resilient fingers formed unitarily on said plug with free ends engageable with the interior of said passage and diverging away from said plug, said passage having the shape of a body of revolution with a generatrix approaching the axis.

2. The apparatus defined in claim 1 wherein said orienting means further comprises resilient metal bands embedded in said fingers and synthetic resin material covering said fingers.

3. The apparatus defined in claim 1 wherein said punch has a diameter between 1 and 3 mm. and is formed with a concavity at its pit-engaging end.

4. The apparatus defined in claim 1, further comprising transport means for displacing at least part of said die along a closed transport path past said plunger; and ejecting means downstream of said plunger for pushing the depitted fruit out of said die.

5. The apparatus defined in claim 4 wherein said die consists of a base section and a body section, said base section carrying said membrane and being axially displaceable relative to said body section, said transport means including endless conveyor means for transversely displacing said body section relatively to said base section.

6. The apparatus defined in claim 5 further comprising shaping means downstream of said punch for reforming the depitted fruit in said die.

7. The apparatus defined in claim 6 wherein said shaping means comprises a shaping rod formed with a chisel point engageable with said prune and a plate above said die and alignable therewith, said fruit being engageable with said plate under the force of said rod.

8. The apparatus defined in claim 4 wherein said ejecting means includes a member engageable through said opening of said die with said fruit for pushing same out of said die.

9. The apparatus defined in claim 4 wherein said ejecting means comprises at least one nozzle and a source of compressed air directed through said die.

10. The apparatus defined in claim 1 wherein said membrane consists essentially of an elastomer with a Shore hardness between 40 and 80, spring steel, or an alloy.

11. The apparatus defined in claim 1 further comprising an endless transport band mounting a plurality of rows of such dies, said rows extending transverse to a transport direction of said band, means for periodically advancing said band a predetermined distance in said direction, and mounting means displaceable transverse to said direction toward and away from said band for holding a number of such plugs and punches equal to the number of dies in each row, and vertical guide means slidably receiving said mounting means.

12. The apparatus defined in claim 11, further comprising a plurality of ejecting rods engageable through said opening for pushing the pitted fruit out of said die, said rods being downstream of said punches and having the same spacing transverse to said transport direction as said rows and being spaced downstream of said punches by a distance equal to a multiple of said predetermined distance.

13. The apparatus defined in claim 11 wherein said die comprises interfitting body and base sections, a number of said base sections equal to the number of said dies in each row being commonly axially displaceable transverse to said transport direction into and out of engagement with said body sections, said base sections being aligned under said plugs and punches.

14. The apparatus defined in claim 13, further comprising drive means including a rotating cam, and means cooperatively connecting said plugs and said base sections to said cam for synchronous operation thereby.

15. The apparatus defined in claim 11, further comprising a plurality of shaping rods downstream of said punches and plugs and engageable through said opening to reform the depitted prunes, said shaping rods being jointly displaceable through said openings, elastic mounting means carrying said shaping rods, and a cover plate above said conveyor opposite said shaping rods, the pitted shaped prunes being engageable against said plate under the force of said rods means.

16. The apparatus defined in claim 11, further comprising drive means, a connecting rod attached at one end to said drive means and at the other end to said plugs, and elastic mounting means between said punches and said plugs permitting axial movement of said plugs relative to said punches.

17. The apparatus defined in claim 11, further comprising drive means including a fluid-actuatable cylinder, a motor, a cam driver by said motor, a valve operable by said cam and connected to said cylinder to operate same, a shaft operatively connected to said transport means, a one-way clutch on said shaft, and a crank on said clutch connected to said cylinder.

* * * * *